(12) United States Patent
Ardashev et al.

(10) Patent No.: US 10,373,159 B2
(45) Date of Patent: Aug. 6, 2019

(54) CONCOMITANCE OF AN ASSET AND IDENTITY BLOCK OF A BLOCKCHAIN

(71) Applicant: International Business Machines Corporation, Armonk, NY (US)

(72) Inventors: Ruslan Ardashev, Rocky Point, NY (US); Sloane Brakeville, Kennesaw, GA (US); Nitin Gaur, Round Rock, TX (US); Gautham Pamu, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 15/371,729

(22) Filed: Dec. 7, 2016

(65) Prior Publication Data

US 2018/0158054 A1    Jun. 7, 2018

(51) Int. Cl.
| | | |
|---|---|---|
| G06Q 20/38 | (2012.01) | |
| G06Q 10/00 | (2012.01) | |
| G06Q 10/10 | (2012.01) | |
| G06Q 50/18 | (2012.01) | |
| G06Q 20/40 | (2012.01) | |
| H04L 29/08 | (2006.01) | |
| H04L 9/32 | (2006.01) | |
| G06Q 30/00 | (2012.01) | |
| H04L 29/06 | (2006.01) | |

(52) U.S. Cl.
CPC .......... *G06Q 20/389* (2013.01); *G06Q 10/00* (2013.01); *G06Q 10/10* (2013.01); *G06Q 50/18* (2013.01); *G06Q 20/3825* (2013.01); *G06Q 20/3829* (2013.01); *G06Q 20/401* (2013.01); *G06Q 30/00* (2013.01); *H04L 9/3247* (2013.01); *H04L 63/08* (2013.01); *H04L 67/306* (2013.01)

(58) Field of Classification Search
CPC .................................................. G06Q 20/3829
See application file for complete search history.

(56) References Cited

U.S. PATENT DOCUMENTS

| | | | | |
|---|---|---|---|---|
| 9,298,806 | B1 * | 3/2016 | Vessenes | G06Q 20/065 |
| 9,397,985 | B1 * | 7/2016 | Seger, II | H04L 63/0442 |
| 9,635,000 | B1 * | 4/2017 | Muftic | H04L 63/0435 |
| 9,985,964 | B2 * | 5/2018 | Andrade | H04L 63/0861 |

(Continued)

FOREIGN PATENT DOCUMENTS

| | | | | |
|---|---|---|---|---|
| WO | WO2017/219007 | * | 12/2017 | H04L 9/52 |
| WO | WO-2017219007 A1 | * | 12/2017 | H04L 9/3247 |

OTHER PUBLICATIONS

Pottsy, The Gold Coast Bulletin, May 14, 2016, News limited, p. 17 (Year: 2016).*

(Continued)

*Primary Examiner* — Kito R Robinson
*Assistant Examiner* — Abdulmajeed Aziz
(74) *Attorney, Agent, or Firm* — Proactive Patents LLC (57) ABSTRACT

A blockchain of transactions may be referenced for various purposes and may be later accessed by interested parties for ledger verification. One example operation may comprise one or more of creating an initial identifier representing an asset and an owner entity of the asset in a blockchain, identifying an identity block associated with the initial identifier, and identifying an asset transfer of the asset from the owner entity to a blockchain entity.

6 Claims, 7 Drawing Sheets

(56) References Cited

U.S. PATENT DOCUMENTS

| | | | |
|---|---|---|---|
| 2010/0106611 A1* | 4/2010 | Paulsen | G06Q 20/10 705/26.1 |
| 2015/0244690 A1* | 8/2015 | Mossbarger | H04L 63/061 713/171 |
| 2016/0164884 A1* | 6/2016 | Sriram | G06Q 10/06315 705/51 |
| 2016/0203572 A1* | 7/2016 | McConaghy | G06F 21/10 705/58 |
| 2016/0217436 A1* | 7/2016 | Brama | G06Q 20/06 |
| 2016/0292680 A1* | 10/2016 | Wilson, Jr. | G06Q 20/02 |
| 2016/0300234 A1* | 10/2016 | Moss-Pultz | G06F 21/10 |
| 2016/0342976 A1* | 11/2016 | Davis | G06Q 20/3829 |
| 2016/0342994 A1* | 11/2016 | Davis | G06Q 20/027 |
| 2017/0046806 A1* | 2/2017 | Haldenby | G06Q 20/0655 |
| 2017/0111175 A1* | 4/2017 | Oberhauser | H04L 9/3247 |
| 2017/0132630 A1* | 5/2017 | Castinado | G06Q 20/4014 |
| 2017/0177855 A1* | 6/2017 | Costa Faidella | G06F 21/45 |
| 2017/0293912 A1* | 10/2017 | Furche | G06Q 20/3829 |
| 2018/0068130 A1* | 3/2018 | Chan | G06F 21/6227 |
| 2018/0285879 A1* | 10/2018 | Gadnis | G06Q 20/38 |

OTHER PUBLICATIONS

"IBM and Crédit Mutuel Arkéa Pioneer the Use of Blockchain to Manage Customer Identity and Improve Customer Satisfaction," News Release, IBM, Jun. 30, 2016, https://www-03.ibm.com/press/us/en/pressrelease/50087.wss.

* cited by examiner

CONCOMITANCE OF AN ASSET AND IDENTITY BLOCK OF A BLOCKCHAIN

TECHNICAL FIELD

This application relates to using a blockchain to track an asset, and more particularly, to referencing blockchain data to track asset ownership and changes in asset ownership.

BACKGROUND

Various issues exist with blockchain applications including an inability to address various provisions such as know-your-customer and anti-money-laundering (KYC/AML), and other regulatory compliance measures, due to the inability of associating identity with transactions. Also, submitting transactions on behalf of an end user can be a challenge with existing authentication and authorization systems.

SUMMARY

One example embodiment may include a method that comprises one or more of creating an initial identifier representing an asset and an owner entity of the asset in a blockchain, identifying an identity block associated with the initial identifier, and identifying an asset transfer of the asset from the owner entity to a blockchain entity.

Another example embodiment may include an apparatus that includes a processor configured to perform one or more of create an initial identifier representing an asset and an owner entity of the asset in a blockchain, identify an identity block associated with the initial identifier, and identify an asset transfer of the asset from the owner entity to a blockchain entity.

Still another example embodiment may include a non-transitory computer readable storage medium configured to store instructions that when executed causes a processor to perform one or more of creating an initial identifier representing an asset and an owner entity of the asset in a blockchain, identifying an identity block associated with the initial identifier, and identifying an asset transfer of the asset from the owner entity to a blockchain entity.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide identity management and association by transaction block linking to an identity block. For example, a reference link or transferable block can be appended to a new transaction block. In one example, upon a trade or sell transaction of an asset, when ownership changes, each network participant can maintain their own authentication and authorization system and create an identity origin block for a first transaction. When a transfer of the asset to another party occurs, the concomitance of the identity block to an asset block on a blockchain network will facilitate the identity information encapsulated in the transaction. As the ownership changes, the new identity origin block can be linked to the transfer dematerialized asset. Upon creation of a new asset, an identity (KYC) is attached to an initial/genesis block if the identity block is created on a blockchain network. This block is immutable and has reference data that includes the KYC identity, and may or may not be visible to the network participants. The identity data should only be exposed in the event of an audit of a transaction or a transaction investigation when the asset is traded or a change of ownership is initiated. The reference block is added either as reference data or is appended to the newly created block (i.e., a configurable option) upon the achievement of a consensus. When the transaction is committed, the identity block of the new owner is added to the committed block. Each asset transfer instance includes a new block transaction that is created and written to the blockchain and more specifically the identity block.

Figure 1A:
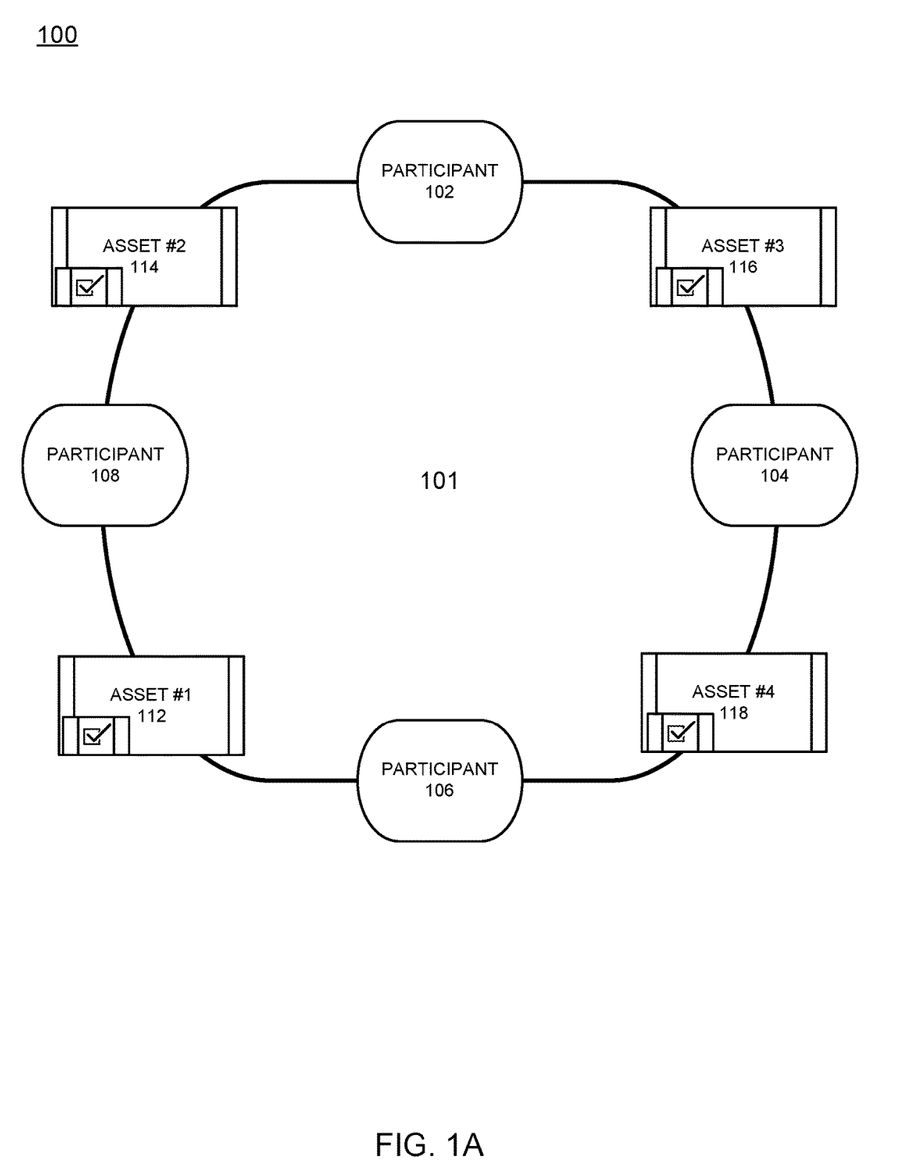
FIG. 1A illustrates an asset certification and ownership network according to example embodiments.

FIG. 1A illustrates an asset certification and ownership network according to example embodiments. Referring to FIG. 1A, the network 100 includes four participants 102, 104, 106 and 108 in a network group 101. Each participant has an asset 112, 114, 116 and 118. The assets are linked to the participants during creation and contain a certification identifying them as being linked to a particular participant. The multi-party/individual party authentication and authorization system includes unlinked entities tied to a genesis block of a blockchain during asset creation.

Figure 1B:
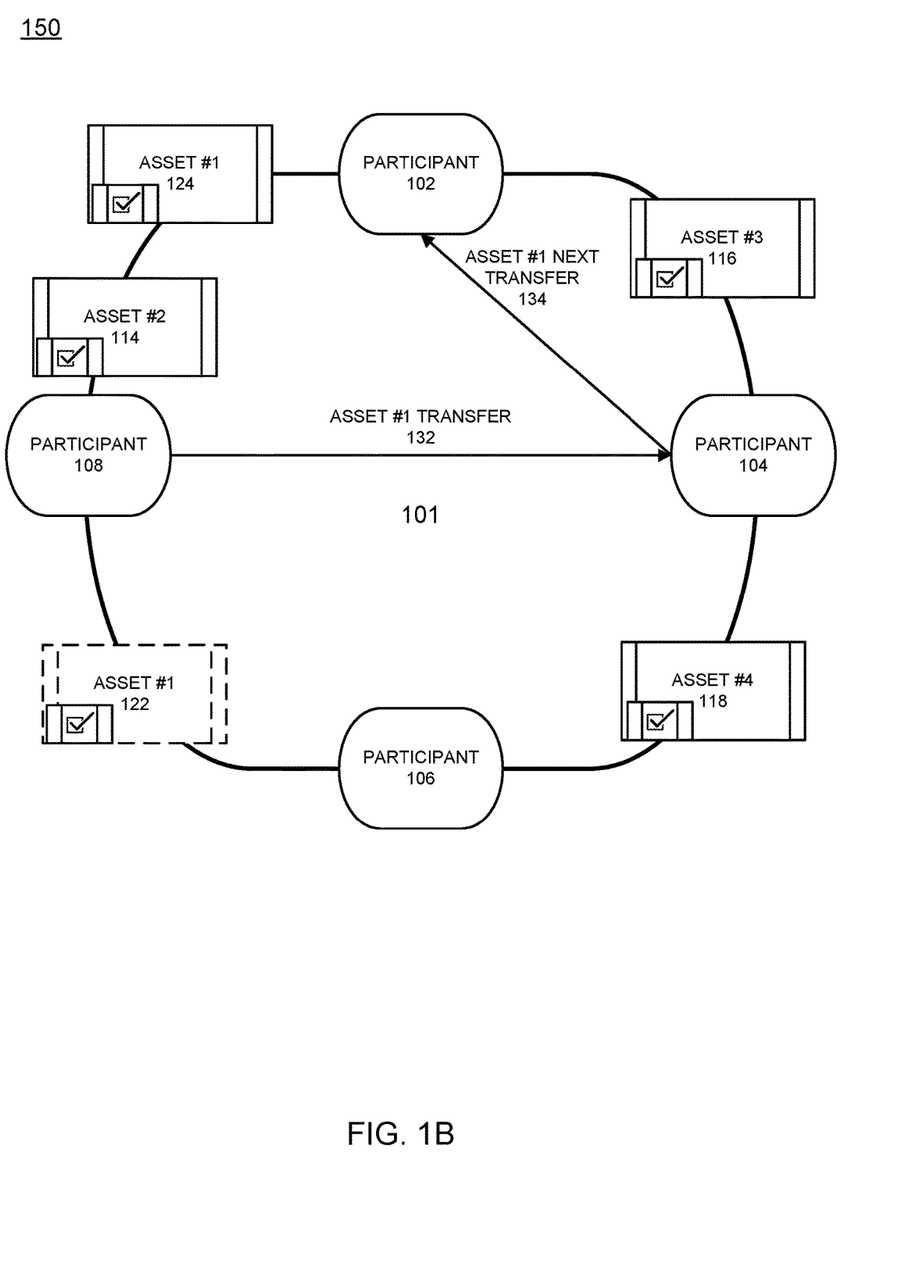
FIG. 1B illustrates an asset transfer example according to example embodiments.

FIG. 1B illustrates an asset transfer example according to example embodiments. Referring to FIG. 1B, a network 150 includes the participant 108 transferring asset #1 122 to participant 104 as a transaction 132. The identity block/genesis block on the blockchain (not shown) is updated to reflect the transaction 132. The provenance of all previous owners/transactions is preserved. In another transaction, the asset #1 124 is transferred again 134 to participant 102. Now, the asset #1 124 belongs to participant 102, however, the provenance includes a record of participant 108 and participant 104 having owned the asset #1 124. All the ownership information is committed to the blockchain.

Concomitance of an identity block with an asset block on a blockchain network provides identity management and association with transaction blocks. The process links the identity block with information such as a reference link or a transferable block that is appendable to a new transaction block. This occurs upon a transaction of a trade of an asset when it changes ownership (i.e., Stocks, Mortgages, financial instruments, etc.). This permits each network participant to maintain their own authentication and authorization system and create an identity origin block for a first transaction and upon transfer of an asset to another party The concomitance of the identity block to the asset block will facilitate the identity information encapsulated in the transaction, and with an ownership change, the new identity origin block is linked to the transfer dematerialized asset. This will preserve the transaction integrity and isolated system of various participants and facilitate compliance for an audit, which permits each network participant to maintain their own authentication and authorization systems and create an identity origin block for a first transaction.

Each network participant will maintain their own authentication and authorization system. This includes user registries, policy server and linkage of transactions to the transaction submitted on the blockchain network. Upon creation of a new asset, the identity (KYC) is attached to the initial/genesis block, subsequently, if the identity, which may exist in the enterprise and not on the blockchain ID block is created on the blockchain network. This block is immutable and has reference data that includes the KYC specific data and may or may not be visible to the network participants, and may only be exposed in the event of an audit of the transaction or a transaction investigation.

When the asset is traded or a change of ownership is initiated, a reference block is added either as reference data or appended to the newly created block (i.e., a configurable option). Upon an achievement of a consensus and when a transaction is committed to the blockchain, an ID block of the new owner is added to a committed block. These steps can be repeated if necessary and/or if the identity is either not available or visible to the network participant. This process can be continued as long as the transactions continue to be traded. Although an identity may not be initially populated on the blockchain networks, there is now a mechanism to preserve an individual network participant's authentication and authorization system(s) and include the ID block for purposes of KYC/AML associated with the assets and transactions.

Figure 2A:
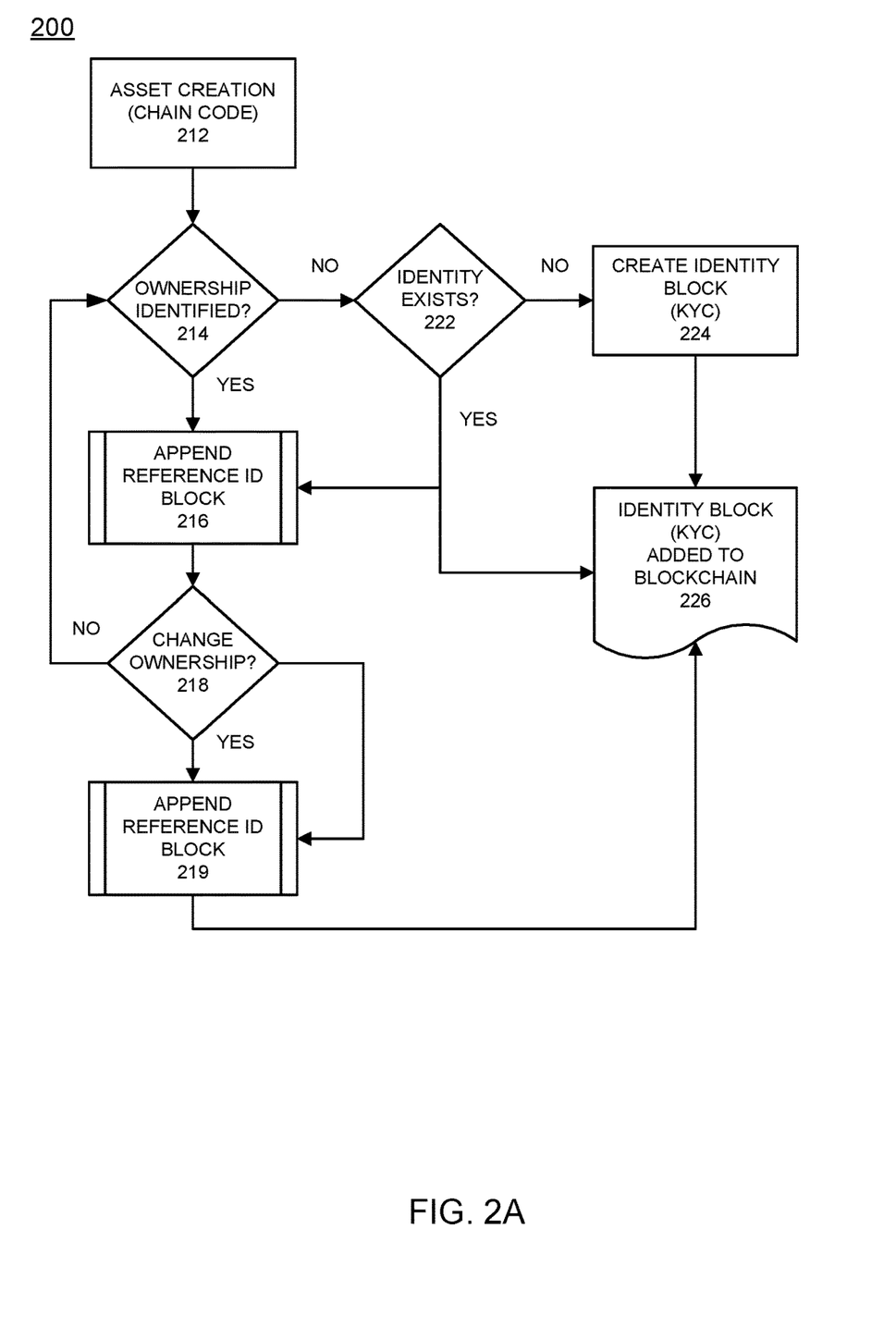
FIG. 2A illustrates a flow diagram of a blockchain-based asset logging and transfer configuration according to example embodiments.

FIG. 2A illustrates a flow diagram 200 of a blockchain-based asset logging and transfer configuration according to example embodiments. In FIG. 2A, the asset is created which may include chain code or other data to represent the asset 212. The ownership is then identified 214, and if the asset is not owned, the identity is checked 222 and if the identity exists, the identity block 226 is added to the blockchain. If the identity does not exist, the identity block is created 224. If the ownership is identified 214, then the reference ID block 216 is appended. The ownership is then identified 218 to determine if any changes have occurred. If so, then the reference ID is appended to the blockchain transaction block 219, and if not, then the ownership is attempted to be identified 214.

Certain industries, such as financial services, healthcare, insurance and cloud service providers may each have a business problem with regard to identity and the ability to protect personal financial and health care record information, for example, with a personal digital signature. In the field of identity management, a user scans his/her identity document and signs the document. The mobile application can generate a private and public key to seal that record, which is encrypted and hashed and sent to the network of communicating nodes running on the blockchain network. Examples of use cases range from enabling aliases on the blockchain in a distributed manner and transferring aliases from user to user. The example embodiments of the present application support unique IDs for customers and invoice and reference numbers. Sensitive documents may be stored based on an identity address on the blockchain.

A mobile identity may be used to generate a public and a private key and store it on the blockchain. For financial and healthcare applications, content creators may stamp their work with their digital signature for later verification of various attributes, such as a copyright, which can be attached to document storage systems. Health care and insurance records can be further protected on the blockchain with user identity signatures. Global agencies and regulation may require digital signature standard X.509, RFC3161 time stamping, eIDAS (EU) electronic identification and trust services, NSTIC (US) national strategy for trusted identities in cyberspace, and the like.

Smart contracts provide a cryptographic blockchain that is used to digitally sign sensitive information and decentralize trust which may be used to develop smart contracts and escrow services, tokenization, authentication, and other services. Payment and corporate remittance may also be supported as blockchain protocols can be used for money transfer across international borders and identity side chain to enterprise blockchain.

Figure 2B:
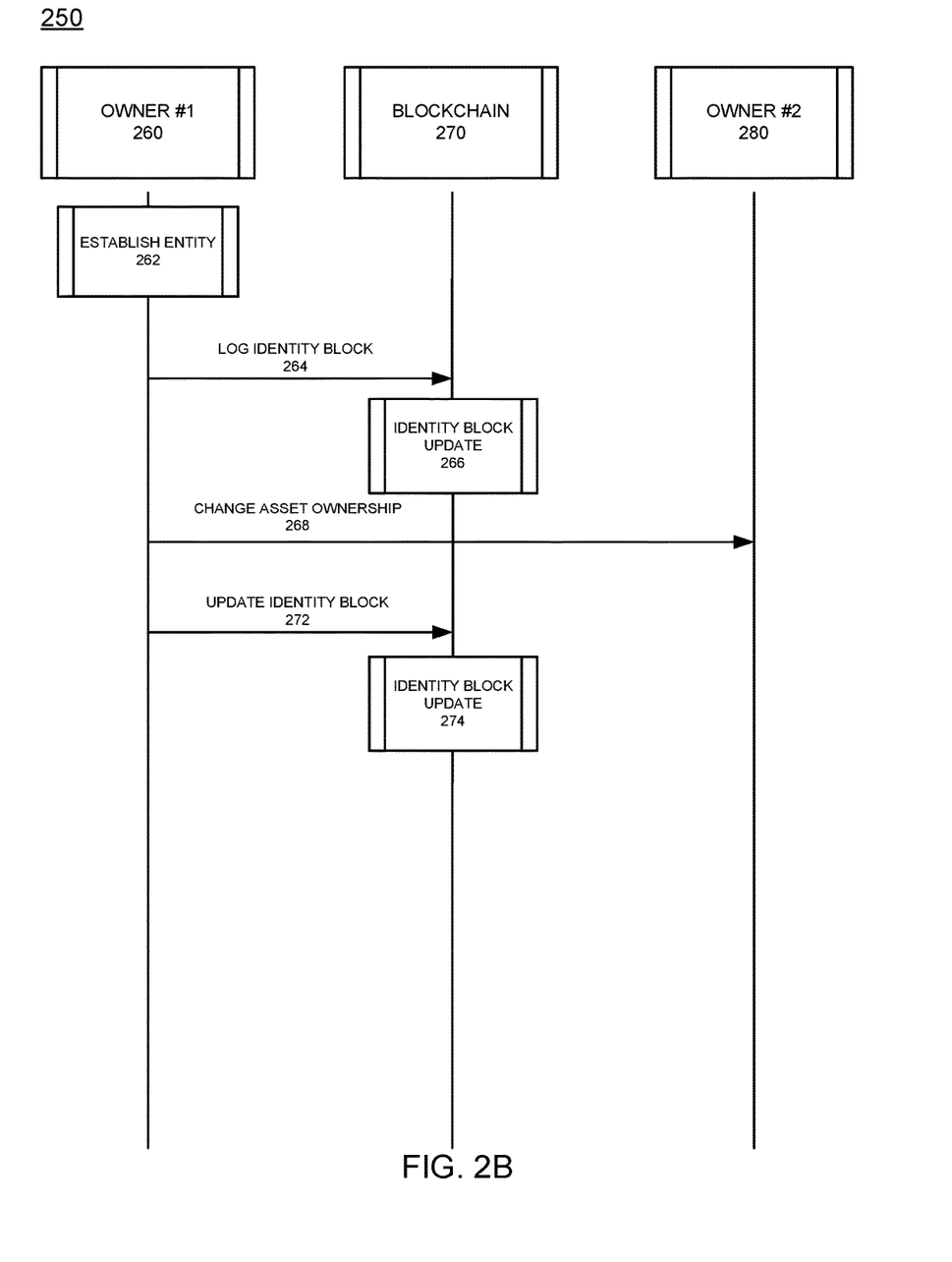
FIG. 2B illustrates a blockchain-based system procedure diagram of tracking assets according to example embodiments.

FIG. 2B illustrates a blockchain-based system procedure diagram of tracking assets according to example embodiments. Referring to FIG. 2B, the system configuration 250 includes a first asset owner/owner device 260 which may be any participant of the blockchain configuration. The owner may establish an entity 262 and log the entity in the blockchain 270 under an identity block 264. The blockchain may update the identity block 266 to include the new asset or any asset transfers which occur. In this example, the asset is logged and then the asset is transferred 268 to a new owner/new owner device 280. The identity block is requested to be updated 272 and the blockchain 270 will update the identity block 274 to identify the transfer.

Figure 3A:
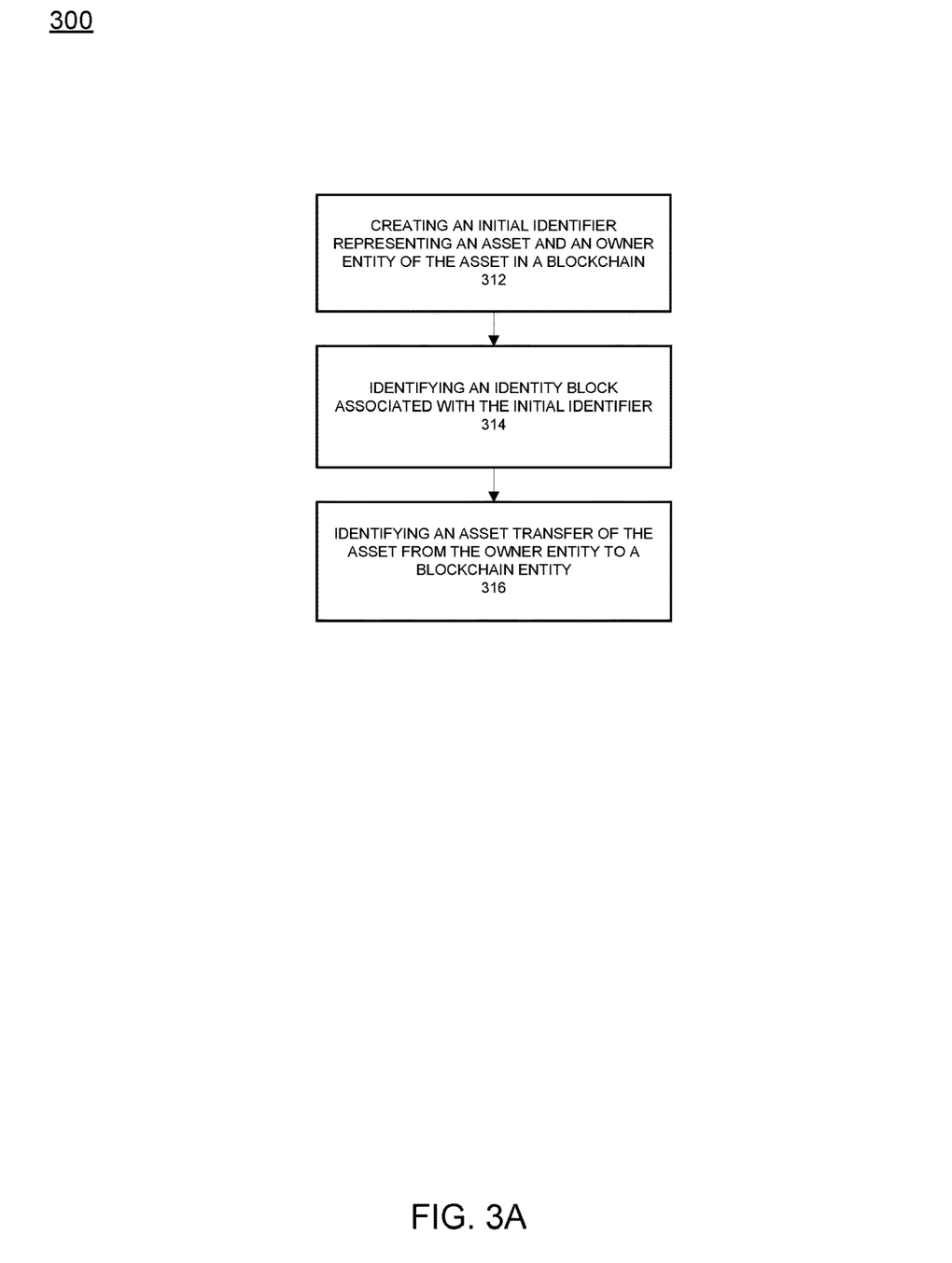
FIG. 3A illustrates a flow diagram of an example method of tracking asset ownership according to example embodiments.

FIG. 3A illustrates a flow diagram of an example method of tracking asset ownership according to example embodiments. In this example, the method 300 comprises one or more of creating an initial identifier representing an asset and an owner entity of the asset in a blockchain 312. The method may also include identifying an identity block associated with the initial identifier 314, and identifying an asset transfer of the asset from the owner entity to a blockchain entity 316. The method may also include storing the initial identifier in a genesis block of the blockchain, and storing the identity block in the blockchain. The method may further provide identifying an additional asset transfer of the asset from the blockchain entity to a new blockchain entity, and appending a new identifier to the identity block associated with the initial identifier, and linking the initial identifier and the new identifier with the asset. The initial identifier may be a know-your-customer (KYC) compatible identifier and may be linked to a new transaction block used to identify the asset transfer in the blockchain. The initial identifier is appended to a new transaction block used to identify the asset transfer in the blockchain.

Figure 3B:
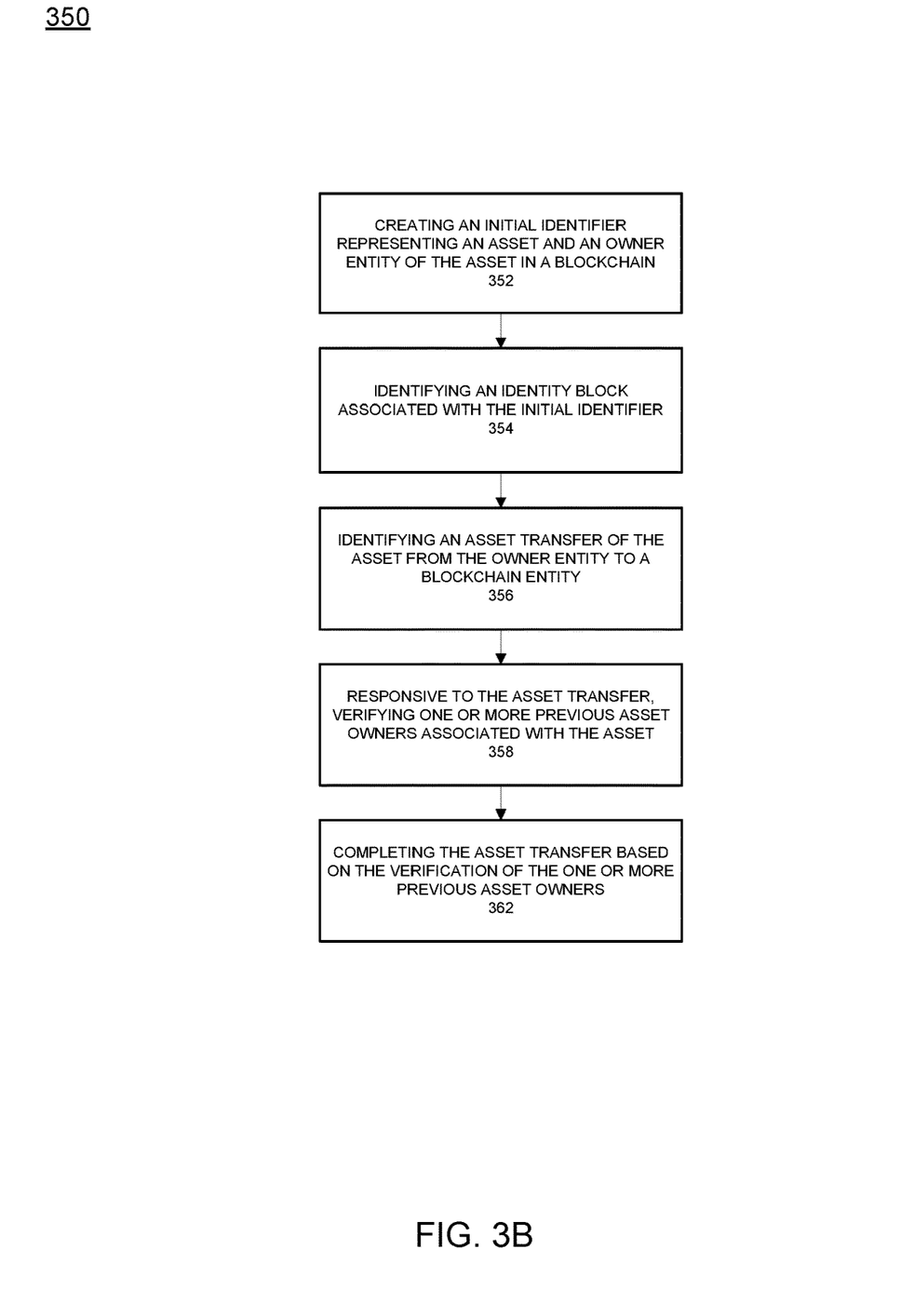
FIG. 3B illustrates a flow diagram of an example method of tracking asset ownership according to example embodiments.

FIG. 3B illustrates a flow diagram of an example method of tracking asset ownership according to example embodiments. Referring to FIG. 3B, the method 350 comprises one or more of creating an initial identifier representing an asset and an owner entity of the asset in a blockchain 352, identifying an identity block associated with the initial identifier 354, identifying an asset transfer of the asset from the owner entity to a blockchain entity 356, responsive to the asset transfer, verifying one or more previous asset owners associated with the asset 358, and completing the asset transfer based on the verification of the one or more previous asset owners 362. In this embodiment, verifying provenance is important, however, individual verification by a participant each time may also be used to ensure the transfer is valid and the identity block is not falsified. The asset may be quarantined until the verification is complete. The verification may be affirmed and then the asset can be forwarded after the verification is confirmed.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
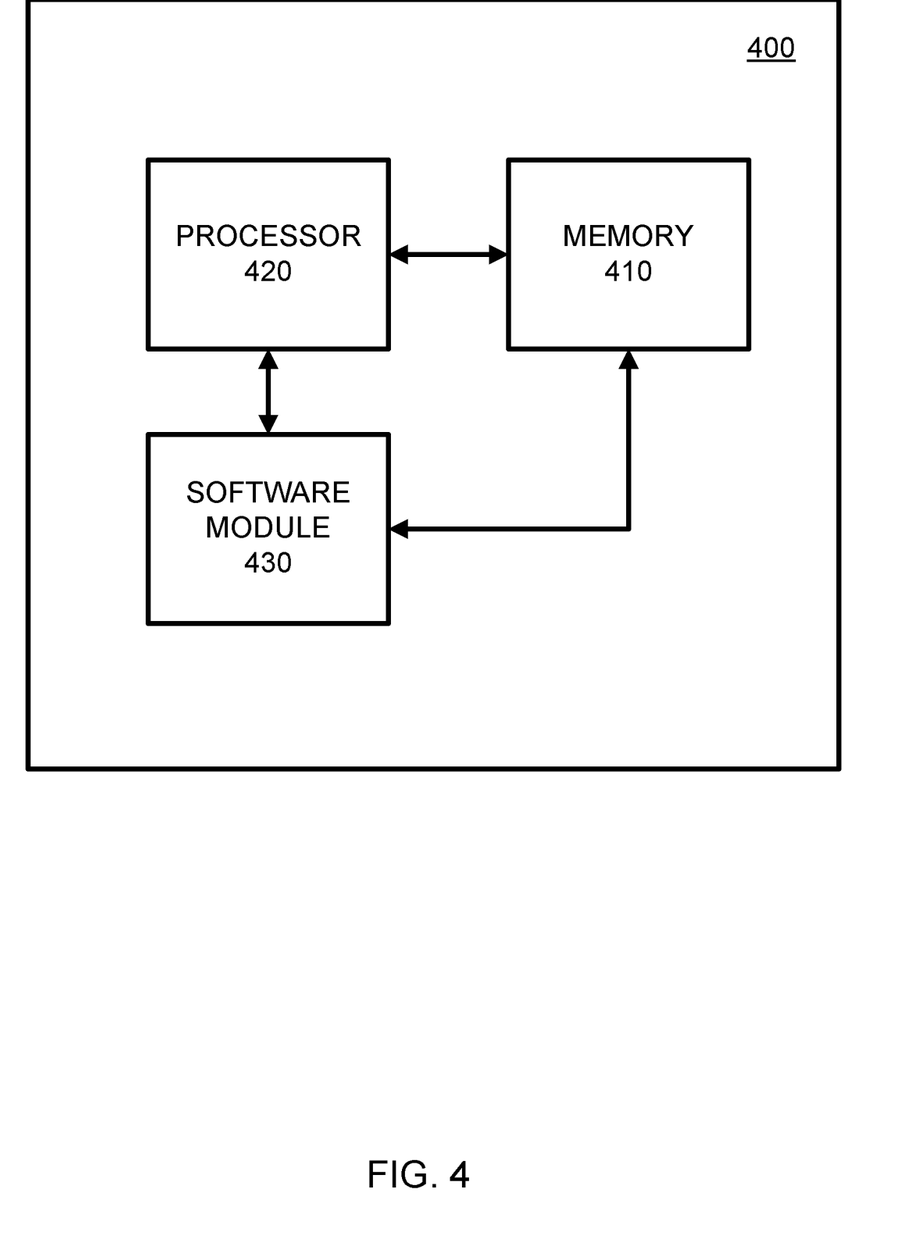
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   creating, via a device associated with an owner entity of an asset, a know-your-customer (KYC) initial identifier representing an asset having an identity stored in a genesis block of a blockchain and the owner entity of the asset;
   storing, via the device, the KYC initial identifier in the genesis block;
   creating, via the device, a new transaction block that identifies, in the blockchain, an asset transfer from the owner entity to a blockchain entity having a KYC identity;
   linking, via the device, the KYC initial identifier to the new transaction block;
   creating, via the device, an identity block, transferable to the new transaction block, the identity block corresponding the KYC initial identifier with the KYC identity of the blockchain entity, wherein the identity block comprises of one or more transferable blocks, each of the one or more transferable blocks corresponding to a different blockchain entity;
   linking, via the device, the genesis block, the new transaction block, and the identity block via the KYC initial identifier;
   logging, via the device, the identity block in the blockchain;
   identifying, via the device, the asset transfer from the owner entity to the blockchain entity based on a comparison of the KYC initial identifier in the identity block and the KYC initial identifier of the new transaction block;
   verifying, via the device, that one or more previous asset owners associated with the KYC initial identifier are included in the identity block responsive to the identifying the asset transfer;
   validating, via the device, the asset transfer by confirming the verification of the one or more previous asset owners associated with the KYC initial identifier in the identity block;
   updating, via the device, the identity block with the asset transfer in response to validating the asset transfer; and
   appending, via the device, a transferable block, of the identity block, corresponding with the blockchain entity to the new transaction block.

2. The method of claim 1, further comprising:
   appending a new KYC identifier to the identity block associated with the KYC initial identifier.

3. An apparatus, comprising:
   a processor of a device associated with an owner entity of an asset, the processor configured to:
   create an initial identifier that represents an asset having a know-your-customer (KYC) identity stored in a genesis block of a blockchain and the owner entity of the asset;
   store the KYC initial identifier in the genesis block;
   create a new transaction block that identifies, in the blockchain, an asset transfer from the owner entity to a blockchain entity having a KYC identity;
   link the KYC initial identifier to the new transaction block;
   create an identity block, transferable to the new transaction block, the identity block corresponding the KYC initial identifier with the KYC identity of the blockchain entity, wherein the identity block comprises of one or more transferable blocks, each of the one or more transferable blocks corresponding to a different blockchain entity;
   link the genesis block, the new transaction block, and the identity block via the KYC initial identifier;
   log the identity block in the blockchain;
   identify the asset transfer from the owner entity to the blockchain entity based on a comparison of the KYC initial identifier in the identity block and the KYC initial identifier of the new transaction block;
   verify that one or more previous asset owners associated with the KYC initial identifier are included in the identity block responsive to the identifying the asset transfer;
   validate the asset transfer by confirming the verification of the one or more previous asset owners associated with the KYC initial identifier in the identity block;
   update, via the device, the identity block with the asset transfer in response to validating the asset transfer; and
   append a transferable block, of the identity block, corresponding with the blockchain entity to the new transaction block.

4. The apparatus of claim 3, wherein the processor is further configured to:
   append a new KYC identifier to the identity block associated with the KYC initial identifier.

5. A non-transitory computer readable storage medium configured to store at least one instruction that when executed by a processor of a device associated with an owner entity of an asset causes the processor to perform:
   creating a know-your-customer (KYC) initial identifier representing an asset having an identity stored in a genesis block of a blockchain and the owner entity of the asset;
   storing the KYC initial identifier in the genesis block;
   creating a new transaction block that identifies, in the blockchain, an asset transfer from the owner entity to a blockchain entity having a KYC identity;

linking the KYC initial identifier to the new transaction block;

creating an identity block, transferable to the new transaction block, the identity block corresponding the KYC initial identifier with the KYC identity of the blockchain entity, wherein the identity block comprises of one or more transferable blocks, each of the one or more transferable blocks corresponding to a different blockchain entity;

linking the genesis block, the new transaction block, and the identity block via the KYC initial identifier;

logging the identity block in the blockchain;

identifying the asset transfer from the owner entity to the blockchain entity based on a comparison of the KYC initial identifier in the identity block and the KYC initial identifier of the new transaction block;

verifying that one or more previous asset owners associated with the KYC initial identifier are included in the identity block responsive to the identifying the asset transfer;

validating the asset transfer by confirming the verification of the one or more previous asset owners associated with the KYC initial identifier in the identity block;

updating the identity block with the asset transfer in response to validating the asset transfer; and appending a transferable block, of the identity block, corresponding with the blockchain entity to the new transaction block.

6. The non-transitory computer readable storage medium of claim 5, configured to store at least one instruction that when executed by the processor causes the processor to perform:

appending a new KYC identifier to the identity block associated with the initial KYC identifier.

* * * * *